Figure 1:
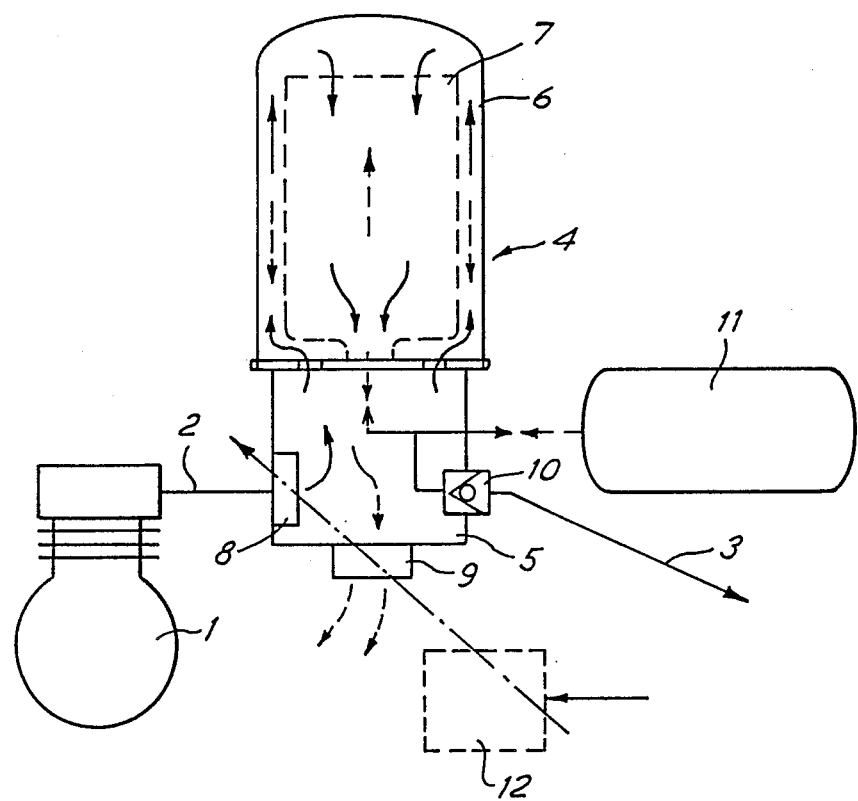

United States Patent [19]

Knight et al.

[11] Patent Number: 4,955,994
[45] Date of Patent: Sep. 11, 1990

[54] COMPRESSED GAS APPARATUS

[75] Inventors: David J. Knight; James M. Kubik, both of Avon Lake, Ohio; Brian P. Neal, Bristol, United Kingdom

[73] Assignees: Allied-Signal Inc., Morristown, N.J.; Bendix Limited, Bristol, England

[21] Appl. No.: 150,693

[22] Filed: Jan. 29, 1988

[51] Int. Cl.⁵ ............................................. B01D 53/04
[52] U.S. Cl. ...................................... 55/163; 55/33; 55/213
[58] Field of Search ................. 55/163, 21, 33, 212, 55/213

[56] References Cited

U.S. PATENT DOCUMENTS

| | | | |
|---|---|---|---|
| 3,464,186 | 9/1969 | Hankison et al. | 55/163 |
| 3,472,000 | 10/1969 | Glass et al. | 55/163 |
| 4,487,617 | 12/1984 | Dienes et al. | 55/163 |
| 4,673,419 | 6/1987 | Kojima | 55/163 |
| 4,713,094 | 12/1987 | Yanagawa et al. | 55/163 |

Primary Examiner—Charles Hart
Attorney, Agent, or Firm—Ken C. Decker; William N. Antonis

[57] ABSTRACT

An air dryer of the type fitted with a purge valve 92 is fitted with an input cut-off valve (81) which closes when the purge valve is opened in order that the compressor output line 2 is not vented thereby maintaining compressor and/or turbo charger pressure during off-load conditions.

5 Claims, 2 Drawing Sheets

COMPRESSED GAS APPARATUS

The present invention relates to compressed gas apparatus and relates especially but not exclusively to compressed gas apparatus the supply to which of compressed gas by a compressor can be interrupted on attainment of a predetermined pressure by opening a valve which enhances the clearance volume for the compressor.

It has been proposed to provide a compressor for charging a compressed air system or reservoir with compressed air, the compressor having a valve operation of which on attainment of a pre-determined pressure connects the pressure chamber of the compressor to an additional volume. The resulting enhancement of the clearance volume of the compressor has an effect of interrupting the supply of compressed air since the pressure downstream of the pressure delivery valve of the compressor remains higher than the pressure now available in the enhanced clearance volume. One such compressor has been described in published U.K. Specification serial No. 2192945. The effect of using a valve which connects such an additional volume to the compression chamber instead of using a more conventional unloader valve which vents the compressor output, is that a substantial part of the energy employed in driving air into the enhanced clearance volume during a compression stroke of the piston of the unloaded compressor is returned to the piston during the returning stroke. Moreover, by virtue of the fact that the compression chamber is not vented during the return stroke of the piston there are longer periods of super-atmospheric pressure therein during operation and there is a reduced tendency for lubricating oil to be drawn into the system from the compressor crankcase between the piston and cylinder wall.

In compressed air systems, especially compressed air braking systems for vehicles, it is common practice to include an air dryer in the delivery line between the compressor and the reservoir or reservoirs it supplies. An air dryer is a highly desirable feature of a modern compressed air braking system because it protects the system against undesirable contaminants such as oil or water which may adversely effect the operation of sensitive valve devices.

An air dryer in a compressed air braking system is normally of a type which contains desiccant material capable of being regenerated from time to time by purging with a metered reverse flow of dry air which is discharged to atmosphere through a purge valve. The purge valve is typically and conveniently operated each time the operation of the compressor is interrupted. If the operation of the compressor is interrupted by means of a valve which is required to enhance clearance volume, as distinct from venting the compressor output, the presence of an air dryer can have a shortcoming in that the clearance volume itself tends to be vented during purging of the air dryer.

A similar shortcoming may be experienced when using, instead of an air dryer, a condenser provided with a drain valve which is operable from time to time to despatch condensed moisture.

Such shortcomings as envisaged above may be added to in the case of an air dryer which is used in conjunction with a compressor which is supplied with input air via a turbo charger. In that case not only may the turbo charger pressure be reduced accompanied by a drop in engine performance but also off-load energy consumption of the compressor will be higher.

According to the present invention there is provided compressed gas apparatus for use with a gas compressor the apparatus including an air dryer or condensor device with valve means for purging or draining moisture from the interior thereof wherein said valve means includes means which also operates to close off a connection between the compressor and the interior of the device.

Preferably the valve means comprises a pair of axially arranged valves with respective mechanically interconnected valve members such that when actuated one member engages its respective seat the other member lifts off its respective seat, said means being biased towards a normal position in which the first valve is opened and the second valve is closed.

Figure 2:
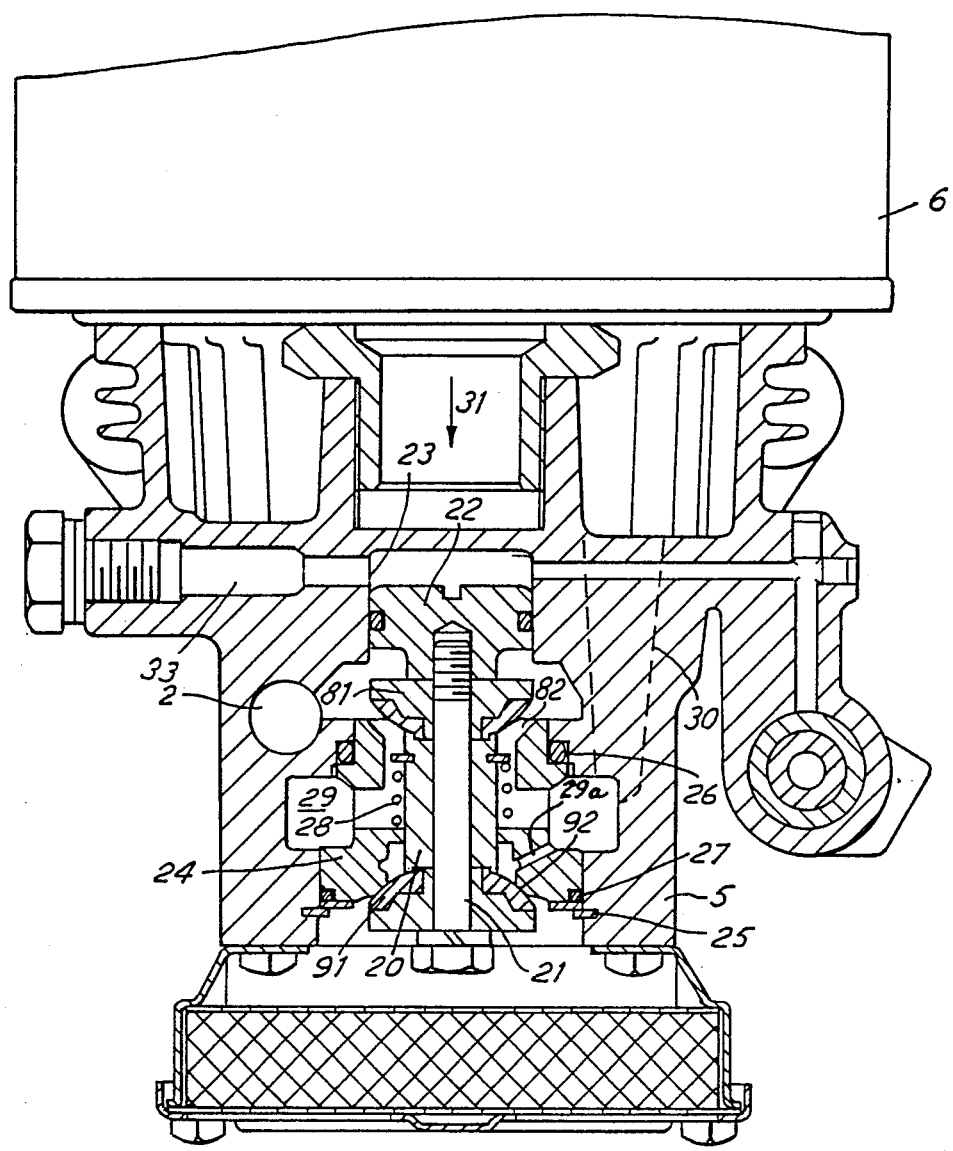

In order that the invention may be more clearly understood and readily carried into effect, the same will be further described by way of example with reference to the accompanying drawings of which:

FIG. 1 illustrates in diagrammatical form a compressed gas apparatus incorporating the invention, and FIG. 2 illustrates a part-sectional view of an air dryer employed in the apparatus of FIG. 1.

Referring to the apparatus of FIG. 1, a compressor denoted by reference 1 intended to be driven by the engine of a vehicle provides a source of compressed air in output connection 2, for charging reservoirs, not shown, via a compressed air pipe 3 of a compressed air braking system. The pipe 2 is connected to pipe 3 via an air dryer denoted generally by reference 4 and the air dryer comprising a main body casting 5 and a replaceable cartridge 6 containing desiccant 7 through which air under pressure is driven by the compressor 1. The body castings is provided with a pair of mechanically interconnected valves denoted by rectangles 8 and 9. The valve 9 is a purge valve which is normally closed and the valve 8 is an isolator valve which is normally opened to permit compressed air to be applied to the interior of the body 5. The flow of compressed air is via paths denoted generally by the solid arrows shown in the drawing from which it is seen airpasses upwards around the interior surface of the cartridge 6 and then downwards through the desiccant 7 to be fed via an output check valve 10 to the pipe 3. A so-called purge volume denoted by reference 11 is connected upstream of the output valve 10 so that it is chargeable to approximately the same pressure as the system connected to pipe 3. The apparatus further includes a governor denoted by the broken outline 12 which is coupled on the one hand to a valve in the cylinder head of the compressor and on the other hand to means for actuating the valves 8 and 9 to their alternative condition wherein valve 9 is opened and valve 8 is closed.

In operation the governor 12 is responsive to attainment of a pre-determined compressed air system pressure and applies a pressure signal to the compressor to cause a small valve (not shown) in the cylinder head to open for the connecting to the compression chamber of a small volume additional to the clearance volume thereby interrupting the supply of compressed air via pipe 2. The simultaneous opening of valve 9 permits purge air initially at system pressure in the air dryer body to pass out via the valve 9, together with the air which is also held in the purge volume 11. The direction of flow of this purge air is indicated by the broken line arrows from which it is seen that this results in a purging of the desiccant 7 by dry air from the purge volume 11 flowing in a direction which is reverse to normal flow direction.

By virtue of closure of the isolator valve 8, the pressure in the pipe 2 and the enhanced clearance volume of the compressor is prevented from being depleted into the vented air dryer. The compressor is thereby able to continue to operate against the thus isolated enhanced clearance volume during the "unloaded" condition. Upon sensing by the governor 12 of a lower pre-determined system pressure, the valves 8 and 9 are switched to their alternative and normal running condition and the additional clearance volume is isolated again from the compression chamber of the compressor, by closure of the mentioned small valve in the compressor head, so that normal charging operation is resumed.

Referring to FIG. 2, this shows on a larger scale a sectional view through the main body casting 5 of the air dryer in FIG. 1. A valve assembly comprises a first valve member denoted by reference 81 and a second valve member denoted by reference 91 corresponding to the valves 8 and 9 of FIG. 1. These valve members are spaced apart by a tubular member 20 and mutually connected by a bolt 21 the upper threaded end of which is screwed into a piston 22 which is sealingly slideable in a bore 23 of the housing. This valve assembly is carried in a valve body 24 located in the main body 5 by a circlip 25 and provided with "O" seals 26 and 27. The valve assembly is spring loaded upwards by a suitable captive coil spring 28 such that in the normal running position the valve member 81 is unseated from its valve seat 82 and the valve member 91 is seated against its respective valve seat 92. In this condition, the input pipe at 2 communicates via the unseated valve 9 with an annular space or cavity 29 from which compressed air is communicated via an upwardly directed passage shown by the broken outlines 30 to the cartridge 6. Compressed air derived from the cartridge 6 flows in the direction of the central downward arrow 31 and out through the check valve 10 (not shown in FIG. 2) to the connection pipe 3 on the one hand and to the purge volume 11 on the other. The effective area of the underside of piston 22 is greater than the seated area of valve member 92. Pressure at 2 is thus effective upon the valve assembly in a resultant sense to keep it in the position shown. This tendency is assisted at all times by the force of captive coil spring 28. Controlling pressure from the governor is supplied in the passage 33 such as to act on the uppermost side of the piston 22 of appreciably larger area which overcomes the spring and the pressure at 20 so that the valve assembly moves downwards. Valve member 81 then seats against seat 82 to isolate supply pipe 2 from annular region or cavity 29 whereas the valve member 91, being unseated from the valve seat 92 results in of the air dryer by connecting the annular region 29 to atmosphere through passage 29a and thereby providing a vent path for reverse slow of air from the purge volume 11 via the desiccant and the passage 30.

In order to ensure that the pressure in the line 2 is maintained as nearly as possibly at the pressure of the reservoirs supplied via line 3, a small capacity bleed path may be included if desired between lines 2 and 3. The flow of air therethrough during normal operation is arranged to be negligible and in certain applications it will have the effect of maintaining a minimal operating pressure in the compression chamber of the compressor when operating off-load to minimize oil carry-over from the compressor crankcase into the air dryer.

The design of the valve means comprising the valve body 24 and the mutually interconnected valve members 81 and 91, is such that it may readily be replaced by a single purge valve in cases where there is no requirement for the isolator valve 8. Furthermore, commensurate with stability in the two operative positions, the relative areas of the valve openings may be made such that valve member 91 is appreciably larger than 81 if required.

The compressor 1 referred to above may be supplied with atmospheric air or alternatively for some applications where more air is required from the same compressor, the compressor may be connected to the output of an engine driven turbo charger and in that case the invention will help to ensure that the turbo charger output is not depleted by the purge condition of the air dryer.

We claim:

1. Compressed gas treatment apparatus for connection in a compressed gas system between a gas compressor and a gas storage reservoir comprising a housing having an inlet port and moisture removing means for removing moisture from the gas, said housing defining a flow path between said inlet port and the moisture removing means, said flow path including a cavity, first valve means between said inlet port and said cavity, a passage defined within said housing for venting said cavity, and second valve means in said housing for controlling said passage, said flow path defining a downwardly extending section through said first valve means interconnecting the inlet port with the cavity and an upwardly extending section between the cavity and the moisture removing means, said cavity being defined between said first valve means and the second valve means, and interconnecting means for interconnecting said second valve means with the first valve means for opening said first valve means to permit communication from the inlet port to the cavity while closing said first valve means to prevent communication through said passage and for closing said first valve means to prevent communication from the inlet port to the cavity when the second valve means is open.

2. Compressed gas treatment apparatus as claimed in claim 1, wherein said first valve means includes a first valve member and a first valve seat and said second valve means includes a second valve member coaxial with said first valve member and a second valve seat coaxial with the first valve seat, said interconnecting means being a rigid link interconnecting the first valve member with the second valve member to define a valve assembly consisting of said first valve member, said second valve member, and said rigid link, and a spring biasing said valve assembly to a normal position in which the first valve means is open and the second valve means is closed.

3. Compressed gas treatment apparatus as claimed in claim 2, wherein said valve assembly includes control means responsive to a control fluid pressure for operating said valve assembly.

4. Compressed gas treatment apparatus as claimed in claim 3, wherein said control means is a fluid pressure responsive piston having a pair of opposed fluid pressure responsive faces, one of said faces being communicated to said control fluid pressure, the other of said faces being communicated to the inlet port.

5. Compressed gas treatment apparatus as claimed in claim 4, wherein each of said first and second valve members has a fluid pressure responsive effective area opposing the effective area of the face of the piston communicated to the inlet port, the effective area of the face of said piston communicated t the inlet port being larger than the total of the fluid pressure responsive areas of the first and second valve members opposing said effective area of the face of the piston communicated to the inlet port, whereby the net force acting on the valve assembly by the fluid pressure at the inlet port tends to bias said valve assembly to a position in which the first valve means is open and the second valve means is closed.

* * * * *